(12) United States Patent
Schreck et al.

(10) Patent No.: US 7,095,201 B1
(45) Date of Patent: Aug. 22, 2006

(54) METHOD AND APPARATUS FOR PROVIDING A USER SELECTABLE START-UP CURRENT IN A DISK DRIVE

(75) Inventors: Erhard Schreck, San Jose, CA (US); Mark Heimbaugh, Pleasanton, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/973,791

(22) Filed: Oct. 9, 2001

Related U.S. Application Data

(60) Provisional application No. 60/239,165, filed on Oct. 10, 2000.

(51) Int. Cl.
*G05B 11/01* (2006.01)

(52) U.S. Cl. .............. 318/560; 318/138; 318/439; 318/254; 360/69; 360/71; 360/75; 360/73.01; 360/73.03

(58) Field of Classification Search ......... 318/138, 318/254, 560, 430–434, 439; 360/69–78; 713/300
See application file for complete search history.

(56) References Cited

U.S. PATENT DOCUMENTS

| | | | |
|---|---|---|---|
| 4,839,754 A | 6/1989 | Gami et al. ............... 360/73.01 |
| 5,016,124 A * | 5/1991 | Fukushima et al. ........... 360/69 |
| 5,216,343 A | 6/1993 | Genheimer et al. ..... 318/568.18 |
| RE34,399 E | 10/1993 | Gami et al. ............... 360/73.01 |
| 5,289,097 A * | 2/1994 | Erickson et al. ............ 318/561 |
| 5,345,347 A | 9/1994 | Hopkins et al. .............. 360/71 |
| 5,381,279 A * | 1/1995 | Dunn ......................... 360/70 |
| 5,397,971 A * | 3/1995 | McAllister et al. ......... 318/254 |
| 5,412,809 A * | 5/1995 | Tam et al. ................... 713/324 |
| 5,457,365 A | 10/1995 | Blagaila et al. ............. 318/430 |
| 5,471,353 A | 11/1995 | Codilian et al. ......... 360/73.03 |
| 5,530,602 A | 6/1996 | Boutaghou et al. ........... 360/75 |
| 5,532,563 A | 7/1996 | Kodama et al. ............. 318/440 |
| 5,627,441 A | 5/1997 | Sakurai et al. .............. 318/599 |
| 5,650,886 A | 7/1997 | Codilian et al. ......... 360/73.03 |
| 5,673,412 A | 9/1997 | Kamo et al. ................. 395/441 |
| 5,689,159 A * | 11/1997 | Culp et al. .................. 318/254 |
| 6,012,124 A | 1/2000 | Kamo et al. ................. 711/114 |
| 6,131,142 A | 10/2000 | Kamo et al. ................. 711/114 |
| 6,218,794 B1 | 4/2001 | Shimizu et al. ............. 318/254 |

* cited by examiner

*Primary Examiner*—Rina Duda
*Assistant Examiner*—Tyrone Smith
(74) *Attorney, Agent, or Firm*—Tejpal S. Hansra

(57) ABSTRACT

A method and apparatus for providing a user selectable start-up current in a disk drive are provided. A user may select a relatively high start-up current to provide a relatively fast start-up time in a disk drive. Alternatively, the user may select a relatively low maximum current draw by the hard drive to enable a relatively low power, low cost power supply to be used in connection with the hard drive, for use with applications in which a relatively long start-up time is acceptable. In connection with applications in which a low cost power supply is to be used, the maximum current drawn by the disk drive may be limited to the amount of current required by the disk drive during seek operations.

20 Claims, 3 Drawing Sheets

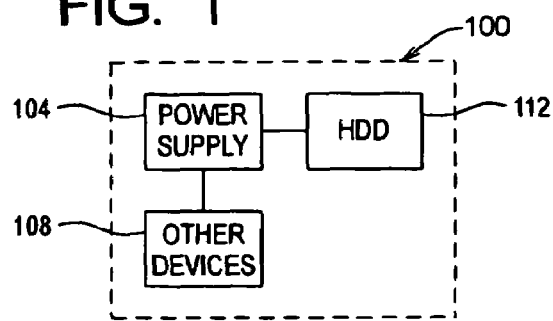
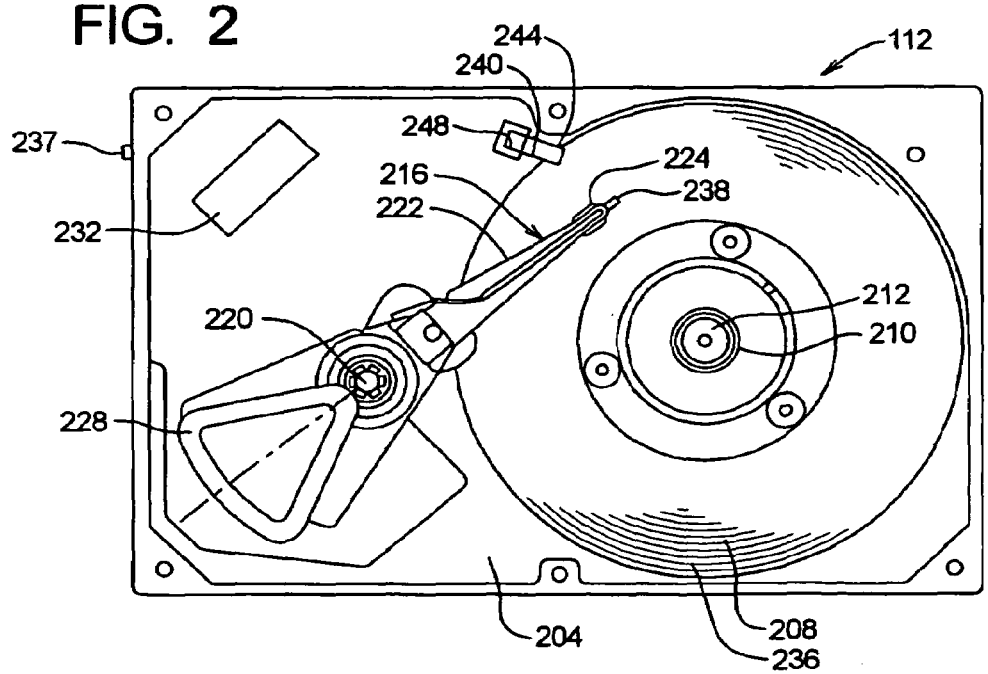

METHOD AND APPARATUS FOR PROVIDING A USER SELECTABLE START-UP CURRENT IN A DISK DRIVE

CROSS REFERENCE TO RELATED APPLICATIONS

Priority is claimed from U.S. Provisional Patent Application Ser. No. 60/239,165, filed Oct. 10, 2000, entitled "USER SELECTABLE START UP CURRENT IN A DISK DRIVE", the disclosure of which is incorporated herein by reference in its entirety.

FIELD OF THE INVENTION

The present invention relates to the provision of a user selectable start-up current in connection with a disk drive. In particular, the present invention allows a user to select a reduced start-up current where limiting the current draw on a power supply is desired, or to select an increased start-up current where a reduced spin-up time is desired.

BACKGROUND OF THE INVENTION

Hard disk drives are used to store large amounts of digital data. In addition to use in connection with general purpose computers, hard disk drives have application in a variety of devices and systems, such as digital video and audio recorders and video game machines. In a typical application, a single power supply is provided for supplying electrical power to the hard disk drive, and to any other devices associated with the apparatus having the power supply. In a typical device interconnected to or including a disk drive, the largest consumer of electrical current is the hard disk drive.

In a contact start stop (CSS) type disk drive, the transducer heads that are used to write information to and read information from the storage disks are suspended above the surfaces of the storage disks by a laminar flow of air created by the spinning of the disks relative to the transducer heads. However, when the disks are not spinning, the transducer heads in such a drive are in contact with the surfaces of the disks. In order to begin spinning the disks from a static state, the stiction between the transducer heads and the surfaces of the disks must first be broken. Breaking this stiction can require providing the spindle motor with an amount of current that is several times greater than the current consumed by the spindle motor and associated disk drive components when the disk drive is in steady state operation (i.e. when the disks have completed spin-up and are rotating at their normal velocity). Accordingly, power supplies used to provide disk drives with operating current have been required to be capable of supplying a relatively large amount of current during start-up of the disk drive, when spin-up of the disks from a static state is required.

In general, spin-up of the disks refers to bringing the disks from a static state to their normal rotational velocity. Start-up of the disk drive refers to bringing the disk drive to a condition in which data may be transferred to or from the disks. Furthermore, the spin-up time refers to the time required to bring the disks from a static state to their normal rotational velocity when read and write operations are conducted. The start-up time refers to the time required to bring the disk drive from a condition in which the disks are stationary to a condition in which read or write operations can be performed. As can be appreciated by one of ordinary skill in the art, the spin-up time may be equal to the start-up time of a disk drive.

More recently, disk drives have been designed with transducer heads that are unloaded from the surfaces of the disks when the disks are stopped or are not spinning quickly enough to create a laminar flow of air sufficient to support the transducer heads over the surfaces of the disks. Such load and unload disk drives therefore remove the need to provide a relatively high start-up current in order to break stiction between the transducer heads and the surfaces of the disks. However, in order to achieve what has been considered to be a reasonably short spin-up time, even such load and unload disk drives have been provided with start-up currents that may be many times greater than the current consumed by a disk drive after spin-up of the disks has been achieved and start-up of the disk drive completed. Furthermore, the current drawn by a conventional disk drive to initiate rotation of the disks is very high because, upon start-up, there is no back electromotive force in the motor used to rotate the disks. Therefore, the start-up current in even a load and unload type disk drive typically establishes the maximum current draw for a particular disk drive.

Systems intended to reduce the power consumed by disk drives during start-up have been proposed. For example, certain systems limit the current supplied to a disk drive upon start-up to a first amount, and if that first amount of current is not successful in rotating the disk, a second, greater amount of current is supplied. Because such systems anticipate supplying increasing amounts of current, they must be provided with power supplies that are capable of reliably supplying those higher amounts of current. Still other devices have attempted to limit start-up current by providing a plurality of windings in the spindle motor. In particular, a relatively large number of windings are used to provide a high start-up torque, and a lesser number of windings are used after higher rotational velocities have been achieved. However, such devices are relatively complicated and expensive to implement. Still other devices limit the current supplied to a disk drive when the current drawn by the disk drive causes the voltage provided by a power supply to drop below a selected amount. However, such an approach results in a disk drive having a variable maximum current draw. Accordingly, existing disk drives have not allowed users to select between a mode that reliably provides a reduced current draw on a power supply, and a mode that provides relatively fast disk spin-up times to achieve relatively fast disk drive start-up times.

SUMMARY OF THE INVENTION

In accordance with the present invention, both a method and an apparatus for providing a user selectable start-up current in a disk drive are provided. The present invention generally allows a user to limit the current drawn by a disk drive to a maximum value that is about equal to the maximum current drawn by the disk drive during seek operations. Alternatively, the user may select an operating mode in which the disk drive draws an amount of current that is several times higher than the current drawn by the disk drive during seek operations performed after the disk has achieved its normal rotational velocity. Accordingly, the present invention allows a user to selectively configure a disk drive for use in connection with a relatively low cost, low capacity power supply, or to provide a decreased start-up time.

In accordance with an embodiment of the present invention, a selection from a user regarding the maximum desired current to be drawn by a disk drive is received. The disk drive is then prevented from drawing more than the selected amount of current, even during start-up operations.

In accordance with a further embodiment of the present invention, the selected maximum current is about equal to the current drawn by the disk drive during seek operations. By limiting the maximum amount of current drawn by a hard disk drive, the user may specify a power supply that is capable of supplying the specified maximum amount of power drawn by the hard disk drive, plus an amount of power required to operate any other devices associated with the apparatus. Furthermore, the present invention allows the user to select an increased start-up time in exchange for being able to utilize a power supply having a lower capacity than could be specified if the maximum current draw of the disk drive were not so limited.

In accordance with another embodiment of the present invention, the user may select a maximum current draw of a hard disk drive that is several times (or more) greater than the current draw of a hard disk drive during seek operations. Such a configuration enables a relatively fast start-up time. However, it requires a power supply that is capable of providing an amount of current equal to the specified maximum amount, plus an additional amount of current required to power any additional devices associated with the device of which the power supply is a part. The selection of a faster start-up time may be desirable in connection with applications that require a relatively fast time to ready.

According to an embodiment of the present invention, a hard disk drive having a user selectable maximum current draw is provided. The user may select the maximum current draw by setting a hardware or software switch. For example, a maximum current draw may be selected by setting a jumper or mechanical switch provided on an exterior of the disk drive. Alternatively, a maximum current draw may be selected by a user by making an appropriate entry to set a software switch, or by modifying software, firmware, or microcode used in connection with controlling the operation of the disk drive. According to still another embodiment of the present invention, a hardware, software, firmware, or microcode switch may be set by the manufacturer of the disk drive in accordance with the specification of the user.

In accordance with an embodiment of the present invention, the selectable maximum current is set to an amount that is about equal to the current draw of the disk drive during seek operations. When such a selection is made, the disk drive is prevented from drawing more than the selected amount of current, and therefore the disk drive is suitable for use in connection with a relatively low capacity power supply.

In accordance with an embodiment of the present invention, the maximum current draw is set to an amount that is at least several times greater than the current draw of the disk drive during seek operations. In this latter configuration, the hard disk drive is suitable for use in connection with systems requiring a relatively fast start-up time, and having a power supply with the capacity required to supply the relatively large current that will be drawn during start-up.

Additional advantages of the present invention will become readily apparent from the following discussion, particularly when taken together with the accompanying drawings.

BRIEF DESCRIPTION OF THE DRAWINGS

FIG. 1 is a block diagram depicting a system including a power supply and a disk drive in accordance with an embodiment of the present invention;

FIG. 2 is a diagrammatic representation of a top view of a conventional computer disk drive, with the cover removed, in which the present invention may be incorporated;

DETAILED DESCRIPTION

Figure 3:
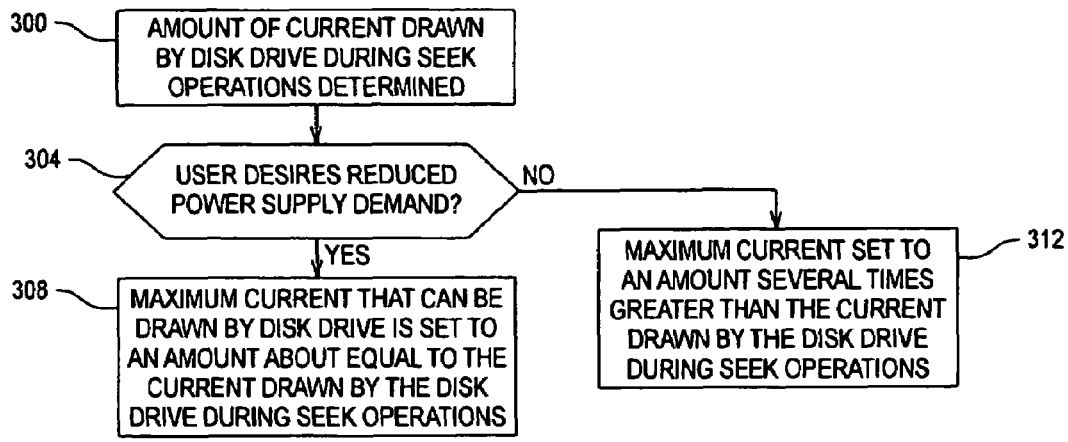
FIG. 3 is a flow chart illustrating the operation of an embodiment of the present invention.

With reference to FIG. 1, a system 100 having a power supply 104 and a disk drive 112 (labeled HDD, or hard disk drive in FIG. 1) is illustrated in block diagram form. The system 100 may include any system in connection with which the provision of a disk drive 112 is desirable. For example, the system 100 may include a personal computer (PC), including a desk top, lap top, notebook, or hand held computer, a digital video and audio recorder (DVR), a video game machine, a portable music player, including an MP3 player, and any other device in connection with which the storage of large amounts of data is desirable.

The power supply 104 is any device capable of providing electrical power. In particular, the power supply 104 is capable of providing a specified amount of current at a selected voltage or voltages. In addition, the power supply 104 may convert power supplied at a first voltage to a second voltage, and may rectify alternating current sources, as required by the disk drive 112, or any other devices 108 interconnected to the power supply 104.

In general, a power supply 104 that is capable of supplying a relatively large amount of current at a specified voltage is more expensive than a power supply capable of supplying a relatively smaller amount of current at that same voltage. Therefore, the designer of a system 100 will typically specify a power supply 104 capable of providing no more than an expected amount of power required by the disk drive 112 and any other devices 108 interconnected to the power supply 104, without experiencing undesirable voltage drops. Furthermore, in a typical system 100, the largest consumer of power interconnected to a power supply 104 is the disk drive 112. More particularly, in connection with a conventional disk drive, the greatest power requirements are experienced during start-up of the disk drive, when the disk or disks are brought from a static state to their normal rotating velocity. Therefore, if the amount of power drawn by a disk drive 112 can be limited, a smaller capacity, and therefore less expensive, power supply 104 can be specified.

The other devices 108 interconnected to the power supply 104 may include control electronics associated with the system 100. Such control electronics may include microprocessors and memory required to implement and control the functions of the system 100. For example, in connection with a system 100 implementing a digital video and audio recorder, the other devices 108 may include a microprocessor responsible for receiving timing and source selection commands from a user, and for providing a signal from the selected source at the selected times to the disk drive 112 for storage as digital data.

With reference now to FIG. 2, a top view of a disk drive 112, with the cover removed, is depicted. The disk drive 112 includes a base 204 and magnetic disks 208 (only one of which is shown in FIG. 2). The magnetic disks 208 are interconnected to the base 204 by a spindle motor 210 mounted within or beneath the hub 212, such that the disks 208 can be rotated relative to the base 204. Actuator arm assemblies 216 (only one of which is shown in FIG. 2) are interconnected to the base 204 by a bearing 220, such that the actuator arm assemblies 216 can be moved radially with respect to the magnetic disks 208. The actuator arm assemblies 216 each include an actuator arm 222, and a transducer head 224 at a first end of the actuator arm 222 to address each of the surfaces of the magnetic disks 208. An actuator 228, such as a voice coil motor positioned at a second end of the actuator arm 222, pivots the actuator arm assemblies 216 about the bearing 220, to radially position the transducer heads 224 across the surfaces of the magnetic disks 208. The actuator 228 is operated by a controller 232 that is in turn operatively connected to a host computer or processor (for example, a processor included as an other device 108, see FIG. 1). By changing the radial position of the transducer heads 224 with respect to the magnetic disks 208, the transducer heads 224 can access different tracks or cylinders 236 on the magnetic disks 208. A jumper switch 237 may be provided to allow drive parameters, such as a maximum current draw of the disk drive 112 to be selected.

The high rotational speed of the magnetic disks 208 in a steady-state run condition creates a boundary layer of air that rotates with the surface of each disk 208. This boundary layer of air is sufficient to support the transducer heads 224 above the surfaces of the disks 208 at a predetermined flying height. Because damage can result when a transducer head 224 contacts a surface of a disk 208, and because the amount of power required to initiate movement of a disk 208 that is in contact with a transducer head 224 is relatively high, disk drives 112 have been developed that "unload" the actuator arm assemblies 216 from the surfaces of the disks 208 when the disks 208 have not achieved a steady state run condition. In particular, disk drive actuator arm assemblies 216 may be provided with tabs or cam followers 238 capable of engaging corresponding cams 240 when the actuator arm assemblies 216 are in a parked position. The cams 240 each generally contain a ramp portion 244 and detent portion 248. When the disks 208 are not in a steady state run condition, the actuator arm assemblies 216 are generally positioned such that the tabs 238 are held in the cams 240 at the detents 248. The transducer heads 224 are said to be "unloaded" from the disks 208 when the tabs 238 are held by the cams 240. The terms "load" and "unload" can be interchanged, however, for purposes of the present disclosure, "unloading" refers to removing a transducer head 224 from the disk 208 surface, and "loading" refers to placing a transducer head 224 adjacent the disk 208 surface such that read and write operations may be carried out. As can be appreciated by one of ordinary skill in the art, the tabs 238 and cams 240 depicted in FIG. 2 are not required in order to effect a disk drive 112 in which the actuator arms 216 can be loaded or unloaded with respect to the disks 208. Therefore, other configurations and structures may be used in accordance with the present invention.

In order for a transducer head 224 to perform read or write operations with respect to a disk 208, the disk 208 must be rotating at a sufficiently high velocity to create the corresponding boundary layer of air that is capable of supporting the transducer head 224 over the surface of the disk 208. As can be appreciated by one of skill in the art, the current required by the spindle motor 210 to begin rotating the disks 208 from a static state is initially very high, because until a back electromotive force is developed in the spindle motor 210, only the internal resistance of the spindle motor 210 limits the current that is drawn. In a conventional disk drive, the maximum amount of current that may be drawn by the spindle motor 210 during start-up is typically further limited to a value that is multiple times (e.g., four or five times) greater than the current drawn by the disk drive 112 during seek operations. Some limitation of the current drawn during start-up is generally desirable because if, for example, the spindle motor 210 is allowed to draw an essentially unlimited amount of current, the voltage of the power supply 104 may drop below a required level, causing malfunctions in other devices 108 supplied power from the power supply 104. In addition, limiting the maximum amount of current that can be drawn by the disk drive 112 during start-up allows lower capacity, less expensive components to be used in the power supply 104 itself, and in the interconnections between the power supply 104 and the disk drive 112.

According to the present invention, the maximum amount of current drawn by the disk drive 112 may be selected by the user. For purposes of the present disclosure, the user may be understood to be an end user of the disk drive 112, or the designer or manufacturer of a system 100 in connection with which the disk drive 112 is used. At an upper limit, the maximum current drawn by the disk drive 112 may be multiple times (for example four or five times) greater than the current drawn by the disk drive 112 during seek operations. Alternatively, the maximum amount of current drawn by the disk drive 112 may be set to a value that is about equal to the current drawn by the disk drive 112 during seek operations. In general, the amount of power required by a disk drive 112 during seek operations represents a maximum current draw of the disk drive during steady-state, non start-up operation. This is because the spindle motor 210, actuator 228, and controller 232 are all drawing current during seek operations.

With reference now to FIG. 3, the operation of a disk drive 112 in accordance with an embodiment of the present invention is illustrated. At step 300, the amount of current drawn by the disk drive 112 during seek operations is determined. Apart from start-up of the disk drive 112, the disk drive's 112 maximum current draw occurs during seek operations. According to one embodiment of the present invention, a seek operation that requires a maximum amount of current, such as a seek from a track 136 located towards the inside diameter of a disk 208 to a target track 136 located towards the outside diameter of the disk 208, is determined. As can be appreciated, the current draw of the disk drive 112 during a seek operation will include the current drawn by the spindle motor 210 as it maintains the rotational velocity of the disks 208 in a steady state (the steady-state spin current), the current draw of the actuator 228 as the transducer heads 224 are moved into position, and the current draw of control electronics and other components of the disk drive 112, such as the controller 232. According to an embodiment of the present invention, the maximum current draw of the disk drive 112 during seek operations is determined for a particular disk drive 112 or class of disk drives 112 by the manufacturer, prior to delivery of the disk drive 112 to the end user.

At step 304, the user determines whether a reduced power supply demand in connection with the system 100 is desired. As noted above, a reduced power supply demand allows the use of a lower capacity power supply 104. The use of a lower capacity power supply 104 generally allows a system 100 to be produced at lower cost than a similar system 100 incorporating a higher capacity power supply 104.

If a reduced power supply demand is desired, the maximum current that can be drawn by the disk drive 112 is set to an amount that is about equal to the current drawn by the disk drive 112 during seek operations (i.e. the amount of current determined at step 300) (step 308). The maximum current draw is generally set to an amount that is slightly higher (for example 13% higher) than the current drawn by the disk drive 112 during seek operations, to provide a margin of error due to manufacturing tolerances, such as when the current drawn during seek operations is determined for a class of disk drives 112 rather than an individual disk drive 112. The maximum current draw may also be set slightly higher than the current drawn by the disk drive 112 during seek operations to accommodate higher than normal current draws during such seek operations, such as may be experienced at extremes of temperature or other environmental conditions, to ensure proper operation of the disk drive.

If a user determines that a reduced power supply demand is not desired, the maximum current is set to an amount that is typically multiple times greater than the current drawn by the disk drive during seek operations (step 312). A maximum current that is multiple times greater than the maximum current drawn during seek operations (e.g., four or five times greater) allows the spindle motor 210 to bring the disks 208 to their normal operating rotational velocity more quickly than if the current draw is limited to the current draw of the disk drive 112 during seek operations. However, as can be appreciated by one of ordinary skill in the art, the provision of higher levels of current to the disk drive 112 during spin-up operations requires a power supply 104 that is capable of supplying that amount of current, while maintaining adequate voltage levels for other devices 108 interconnected to the power supply 104, and without damage to those other devices 108 or to the power supply 104 itself. Reduced start-up times may be desirable in connection with systems 100 running operating systems having relatively short time to ready requirements (e.g., five seconds or less) or in connection with systems 100 with respect to which reduced start-up times are otherwise considered desirable. In general, some limitation in the maximum amount of current that can be drawn by the disk drive 112 during start-up is desirable, so that the power supply 104 is not required to meet what could otherwise be essentially unlimited power supply demands.

Figure 4:
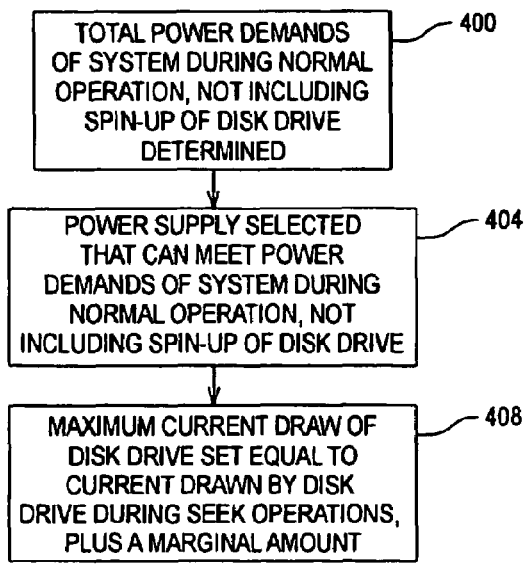
FIG. 4 is a flow chair depicting the operation of another embodiment of the present invention.

With reference now to FIG. 4, steps that may be taken in sizing a power supply 104 in accordance with an embodiment of the present invention are illustrated. Initially, at step 400, the total power demands of the system 100 during normal operation, is determined. With respect to step 400, normal operation is not considered to include the spin-up of the disks 208 of the disk drive 112. Accordingly, normal operation may include all functions of the system 100 that may occur when the disks 208 of the disk drive 112 have reached their normal operating rotational velocity, such as seek operations. In general, the maximum power demands of the system 100 during such normal operation are determined.

At step 404, a power supply 104 for use in connection with the system 100 is selected that has the capacity required in order to meet the maximum power demands of the system 100 during normal operation determined at step 400. That is, the power supply 104 is sized so that it can adequately supply power to the disk drive 112 during normal operation and any other components 108 of the system 100 simultaneously. Because the power supply 104 is not sized to adequately supply the larger amount of current that could be drawn by the disk drive 112 during spin-up of the disks 208, it can have a smaller capacity, and therefore can be less expensive than an otherwise comparable power supply 104 sized to provide a larger amount of current to the disk drive 112 during start-up.

The maximum current draw of the disk drive 112 is then set equal to the current drawn by the disk drive 112 during seek operations, plus a small marginal amount (step 408). By so limiting the maximum amount of current that can be drawn by the disk drive 112, a power supply 104 that has not bee sized to provide a relatively large amount of current during start-up of the disk drive 112 will be capable of adequately supplying power to the disk drive 112 and the other devices 108 associated with the system 100, even during spin-up of the disks 208 (i.e. during the disk drive's 112 start-up operations). Therefore, potentially damaging voltage drops in the system 100 are avoided, even during spin-up of the disks 208, and even though a relatively low capacity power supply 104 has been provided.

Figure 5:
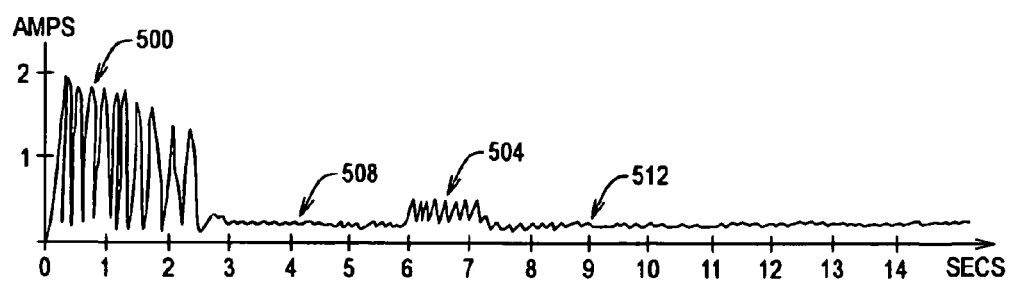
FIG. 5 is a graph depicting the current drawn by a hard disk drive in accordance with an embodiment of the present invention.

With reference now to FIG. 5, an example of the current drawn during spin-up of the disks 208 by a disk drive 112 in accordance with an embodiment of the present invention that has been configured for a relatively fast start-up time is illustrated. As shown in FIG. 5, in region 500, which corresponds to spin-up of the disks 208 during start-up of the disk drive 112, the maximum current draw of this disk drive 112 is about 2 Amps. In contrast, at region 504, which corresponds to a typical seek operation, the maximum current draw of the disk drive 112 is about 0.5 Amps. During times at which the disks 208 are maintained at their normal rotating velocity, but no other activity with respect to the device occurs, the disk drive draws about 0.25 Amps (see, e.g., regions 508 and 512). That is, the steady-state spin current drawn by the disk drive 112 is about 0.25 Amps. With respect to the disk drive 112 configured for a relatively fast start-up time, about two and one-half seconds are required to spin-up the disks 208 and otherwise complete start-up operations. Therefore, read and write operations with respect to the disk drive 112 may commence after about two and one-half seconds in the example illustrated in FIG. 5.

Figure 6:
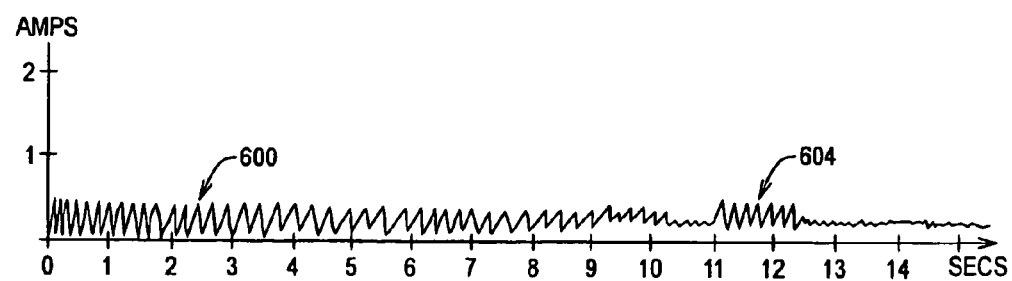
FIG. 6 is a graph depicting the current drawn by a hard disk drive in accordance with another embodiment of the present invention.

With reference now to FIG. 6, an example of the current drawn by a disk drive 112 in accordance with an embodiment of the present invention that has been configured for use in connection with a relatively low capacity power supply is illustrated. As shown in FIG. 6, in region 600, which corresponds to spin-up of the disks 208 during start-up of the disk drive 112, the maximum current draw during start-up is about 0.5 Amps. Although the disk drive 112 in the example of FIG. 6 may otherwise be identical to the disk drive 112 in the example of FIG. 5, in the embodiment illustrated in FIG. 6 the maximum current draw has been limited to 0.5 Amps. It will be noted that the maximum current draw of the disk drive 112 during seek operations, illustrated at region 604, (i.e. the maximum current draw during non-start-up operations) is also about 0.5 Amps. Furthermore, the disk drive 112 in the example of FIG. 6 draws about 0.25 Amps while the disks 208 are maintained at their normal rotational velocity but while the disk drive 112 is otherwise idle (i.e. the steady-state spin current of the disk drive 112 is about 0.25 Amps). With respect to the disk drive 112 configuration illustrated in FIG. 6, about 10 seconds are required to complete spin-up of the disks 208. Therefore, read and write operations with respect to the disk drive 112 may commence after about 10 second in the example illustrated in FIG. 6.

From the examples given in FIGS. 5 and 6, it can be appreciated that the current demands of a disk drive 112 can be significantly reduced if relatively longer start-up times can be tolerated. As shown in the examples above, a disk drive 112 may be capable of bringing its magnetic disks 208 to their normal rotational velocity in about two and one-half seconds if the spindle motor is allowed to draw as much as 2 Amps during spin-up (see FIG. 5). In contrast, the same disk drive 112 requires about 10 seconds to bring the disks 208 to their normal rotational velocity if the current during spin-up of the disks 208 is limited to about 0.5 Amps (see FIG. 6). However, the disk drive 112 having a lower maximum current draw (e.g., as illustrated in FIG. 6) can be used in connection with a lower capacity, lower cost power supply 104 than can the disk drive 112 that is allowed to draw a higher maximum current (e.g., as illustrated in FIG. 5).

A disk drive 112 in accordance with the present invention may allow a user to select from a plurality of maximum currents. For example, according to an embodiment of the present invention, the user may select from a first maximum current draw, about equal to the current drawn by the disk drive 112 during seek operations, or a second maximum current draw that is many times (e.g., five times) higher than the current drawn during seek operations. According to another embodiment of the present invention, the user may select from a plurality of values, or may specify a value, between and including a first amount about equal to the current drawn by the disk drive 112 during seek operations, and a second amount that is many times greater than the first amount. Furthermore, it should be appreciated that the maximum current draw of a disk drive 112 configured for a relatively fast start-up time need not be an integer multiple of the current drawn during seek operations.

The selection by the user may be established using hardware switches provided as part of the disk drive 112. Alternatively or in addition, programming code associated with the disk drive 112 may be used to set the maximum current that can be drawn by the disk drive. For example, software, firmware, or microcode running on or embedded in the controller 232 may be used to set the maximum current drawn by the disk drive 112. Furthermore, it should be appreciated that the user may select the maximum current drawn by specifying that value to the manufacturer of the disk drive 112, and having the manufacturer configure the disk drive 112 to meet the user's requirements.

As can be appreciated by one of ordinary skill in the art, the maximum current drawn by the disk drive 112 may be controlled in various ways. For example, pulse width modulation schemes may be used to provide an average current that is within the specified maximum. In addition, transconductance amplifiers can be used to control the amount of current drawn by the disk drive 112. In general, the particular scheme used to control the current draw of the disk drive 112 is not important to the present invention. However, it is desirable that the current drawn by the disk drive 112 be selectable by the user, either prior to or after delivery of the disk drive 112 to the user, and that the selected maximum current cannot be exceeded by the disk drive 112 after the selection has been made.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method comprising:
   providing a disk drive operable to be used with a first power supply and a second power supply, wherein the first power supply has a lower power capacity than the second power supply, and wherein the disk drive has a maximum current draw that is selectable by a user;
   receiving a maximum current draw first selection, selected by said user, without the user making a second selection in order to select said maximum current draw;
   selecting between the first power supply and the second power supply based upon the maximum current draw first selection; and
   limiting an actual current draw of said disk drive to said selected maximum current draw.

2. The method of claim 1, wherein said selected maximum current draw is about equal to an amount of current drawn by said disk drive during seek operations.

3. The method of claim 1, wherein said selected maximum current draw is about equal to a steady-state spin current of a spindle motor of said disk drive plus a current drawn by an actuator of said disk drive when said actuator is in operation.

4. The method of claim 2, wherein said current drawn during seek operations is equal to a steady-state spin current of a spindle motor of said disk drive, plus a current drawn by an actuator when said actuator is in operation, plus an amount of current drawn by control electronics associated with said disk drive.

5. The method of claim 1, wherein said selected maximum current draw is equal to about four times an amount of current drawn by said disk drive during seek operations.

6. The method of claim 1, wherein said selected maximum current draw is selected from a plurality of current amounts.

7. The method of claim 6, wherein said plurality of current amounts comprise a first amount equal to about a steady state spin current of said disk drive plus an amount of current drawn by an actuator of said disk drive during seek operations, and wherein a selection of said first amount results in a disk drive start-up time that is greater than a disk drive start-up time resulting from a selection of a second amount that is greater than said first amount.

8. The method of claim 7, wherein a selection of said first amount results in said first power supply being selected, and wherein a selection of said second amount results in said second power supply being selected.

9. The method of claim 1, wherein said step of receiving a maximum current draw selection comprises setting a hardware switch.

10. The method of claim 9, wherein said hardware switch comprises at least one of a jumper and a mechanical switch.

11. The method of claim 1, wherein said step of receiving a maximum current draw selection comprises specifying a maximum current draw selection through at least one of a software command, a firmware command, and a microcode command.

12. A method for reducing the current supply requirements of a power supply interconnected to a disk drive, comprising:
   providing a power supply;

providing a disk drive comprising:
  at least a first storage disk;
  a spindle motor;
  an actuator; and
  at least a first transducer head;
determining a maximum normal operating current draw of said disk drive, wherein said maximum normal operating current does not include an amount of current drawn by said disk drive during start-up;
selecting, by a user, a maximum disk drive supply current;
supplying from said power supply said maximum disk drive supply current to said disk drive during start-up of said disk drive;
loading said transducer head onto said storage disk,
wherein said power supply is sized to provide said maximum normal operating current draw of said disk drive, plus an amount of current required by at least a first power consumer in addition to said disk drive, and wherein said power supply is not sized to provide an amount of current equal to said maximum current draw of said disk drive multiplied by a value equal to or greater than two.

13. The method of claim 12, wherein said step of loading said transducer head onto said storage disk is performed after said at least a first storage disk has achieved a predetermined rotational velocity.

14. The method of claim 12, further comprising providing a first amount of current during start-up that is greater than a maximum normal operating current of said disk drive in response to a user selection, wherein said maximum disk drive supply current is equal to said first amount, and wherein a start-up time of said disk drive is reduced as compared to a start-up time of said disk drive when said current is limited to said maximum normal operating current of said disk drive.

15. The method of claim 12, wherein said step of selecting a maximum supply current comprises setting a switch.

16. The method of claim 15, wherein said switch is at least one of a jumper and a mechanical switch.

17. The method of claim 15, wherein said disk drive further comprises a controller, and wherein said switch comprises a software switch provided by at least one of software, firmware, or microcode running on said controller.

18. A method for providing a disk drive having a maximum current draw which is selectable by a user, comprising:
  receiving a maximum current draw first selection, selected by said user, without the user to make a second selection in order to select said maximum current draw; and
  limiting an actual current draw of said disk drive to said selected maximum current draw, wherein said selected maximum current draw is selected from a plurality of current amounts, wherein said plurality of current amounts comprise a first amount equal to about a steady state spin current of said disk drive plus an amount of current drawn by an actuator of said disk drive during seek operations, and wherein a selection of said first amount results in a disk drive start-up time that is greater than a disk drive start-up time resulting from a selection of a second amount that is greater than said first amount.

19. The method of claim 18, wherein a selection of said first amount allows a power supply having a first capacity, and wherein a selection of said second amount requires a power supply having a second capacity, wherein said second capacity is greater than said first.

20. The method of claim 12, wherein said power supply is sized to provide said maximum disk drive supply current to said disk drive plus an additional amount of current, wherein said additional amount of current is less than said maximum disk drive supply current.

* * * * *